Figure 1:
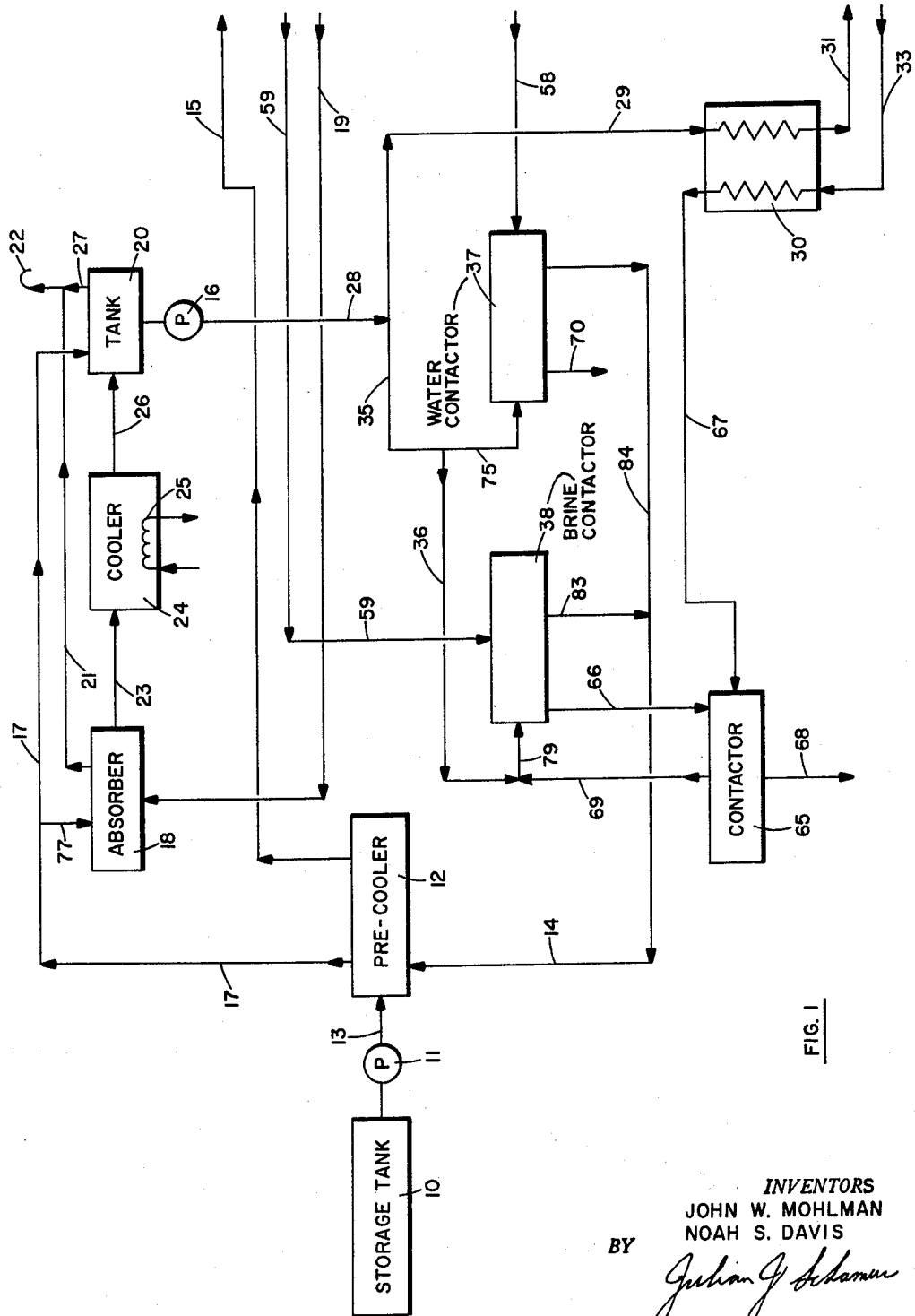

INVENTORS
JOHN W. MOHLMAN
NOAH S. DAVIS
BY
ATTORNEY

INVENTORS
JOHN W. MOHLMAN
NOAH S. DAVIS

BY

ATTORNEY 3,183,679
REMOVING REFRIGERANT CONTAMINANTS AND DISSOLVED GASES IN A FRACTIONAL CRYSTALLIZATION PROCESS
John W. Mohlman, Woodland Hills, and Noah S. Davis, Northridge, Calif., assignors, by mesne assignments, to Struthers Scientific and International Corporation
Filed Mar. 23, 1961, Ser. No. 97,935
14 Claims. (Cl. 62—58)

This invention relates to a process for removing solute from solutions. In one embodiment, the process relates to the purification of sea water by concentration and removal of water having a relatively low salt concentration.

It has been proposed to obtain potable water and concentrated salt solution from sea water by a process which involves freezing the sea water into ice which is relatively free of dissolved salts, which ice is removed from the sea water and melted to give potable water. One method for obtaining less concentrated salt solutions from set water by freezing involves freezing the sea water in direct contact with a volatile liquid refrigerant. In order to conserve energy in the system and produce relatively uncontaminated water at a reasonable cost, it is necessary to make the energy requirements of the process as low as possible. In order to operate the process with minimum energy input, the refrigerant gas produced in freezing the water is compressed and contacted with the ice, after separation from the brine, to condense and cool the refrigerant for reuse in the freezing operation.

In order to make this process even more economically attractive, it has been suggested that the incoming sea water to be purified be pre-cooled to near its freezing point prior to being frozen in direct contact with the refrigerant. The preferred method for precooling the incoming saline involves direct contact heat-transfer with a supplemental cooling fluid which is relatively immiscible with the water and which has a vapor pressure such that it will not appreciably volatilize during the heat exchange process.

In all such processes inert gases dissolved in the solution must be removed as a first step in the process or eliminated at some step during operation of the process. Thus, it has been suggested that the sea water to be purified first be deaerated and then subjected to the process steps. Alternatively, inert gases may be vented from the system when the compressed refrigerant from the freezing step is condensed in contact with the ice formed. Deaerating the water prior to subjecting it to the freezing process increases the energy requirements of the system, while venting the inert gases in the condensation step entails a large loss of refrigerant vapors. Both of these procedures greatly increase the cost of converting the sea water into water fit for consumption or industrial use. It is not possible to avoid some elimination of inerts even if the deaerator is employed. Since the deaerator will not remove all dissolved air, the concentration of inerts constantly builds up in the compressor cycle and still further increases the energy requirement of the system. If, due to build up in the compressor cycle, inert gases are not removed, the system eventually becomes inoperative.

In the process which employs a supplemental low vapor pressure heat-transfer medium for pre-cooling the incoming sea water further problems of stream contamination arise. For example, when kerosene and butane are used as the heat-transfer medium and refrigerant respectively, and where the cold effluent brine and purified water are heat exchanged with the kerosene, then butane carried along in the water and brine will contaminate the kerosene. This will tend to dilute the kerosene and increase its vapor pressure. Further dissolved inert gases, such as oxygen and nitrogen will tend to concentrate themselves in the butane refrigerant cycle. Thus, loss of butane refrigerant and heat-transfer medium and mutual contamination arise from the operation of such a process.

It is, therefore, an object of this invention to provide an improved process for purification of solvents by freezing the solvent in direct contact with a vaporizable liquid refrigerant. A further object of the invention is to provide an improved process for obtaining fresh water from the sea. Another object of the invention is to provide a solvent purification process which minimizes refrigerant and heat-transfer medium contamination and loss and the work necessary in compressing refrigerant vapors.

Figure 2:
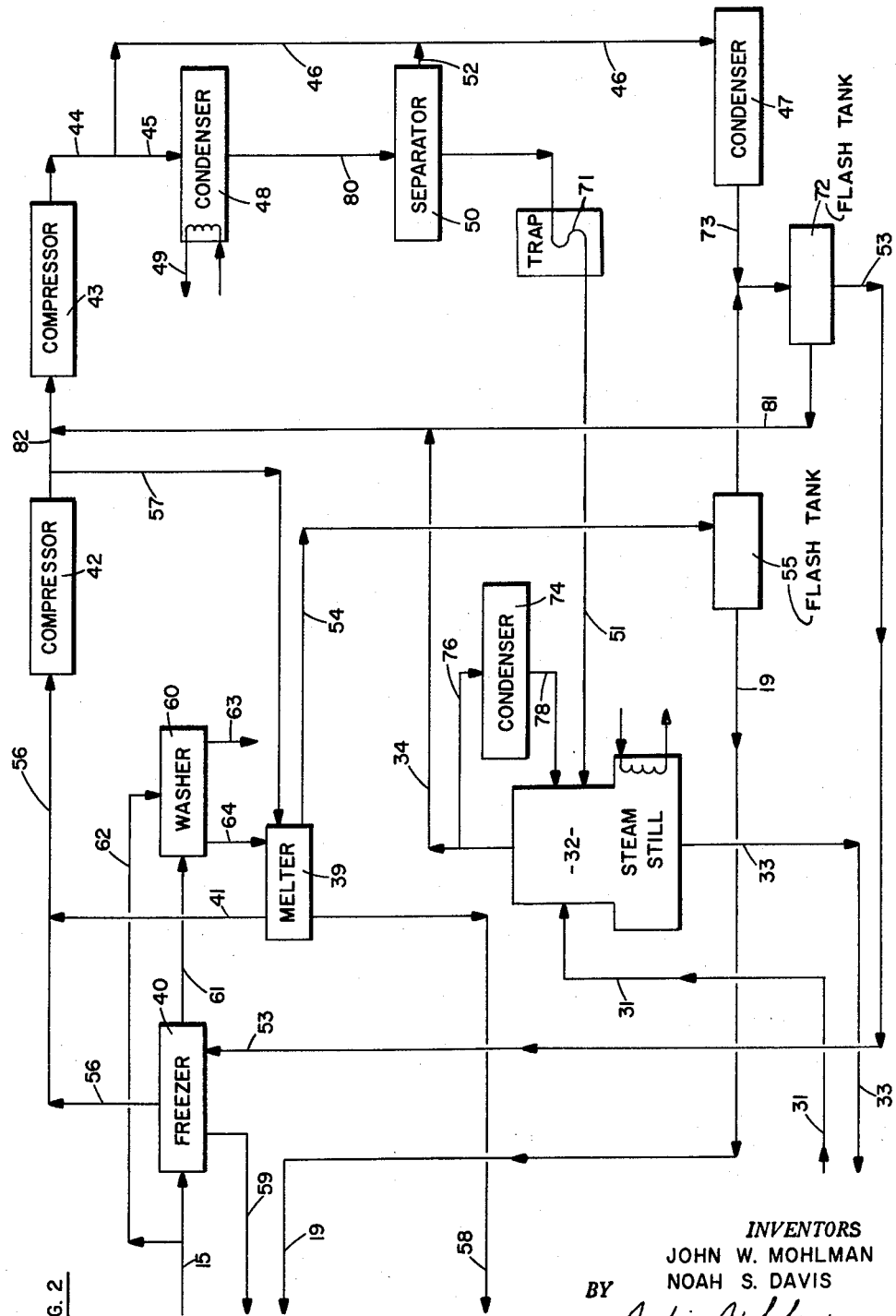

In the drawings accompanying this application, FIGS. 1 and 2 are schematic diagrams of a process employing a relatively non-volatile heat-transfer medium in conjunction with a vaporizable liquid refrigerant according to an embodiment of this invention.

Figure 3:
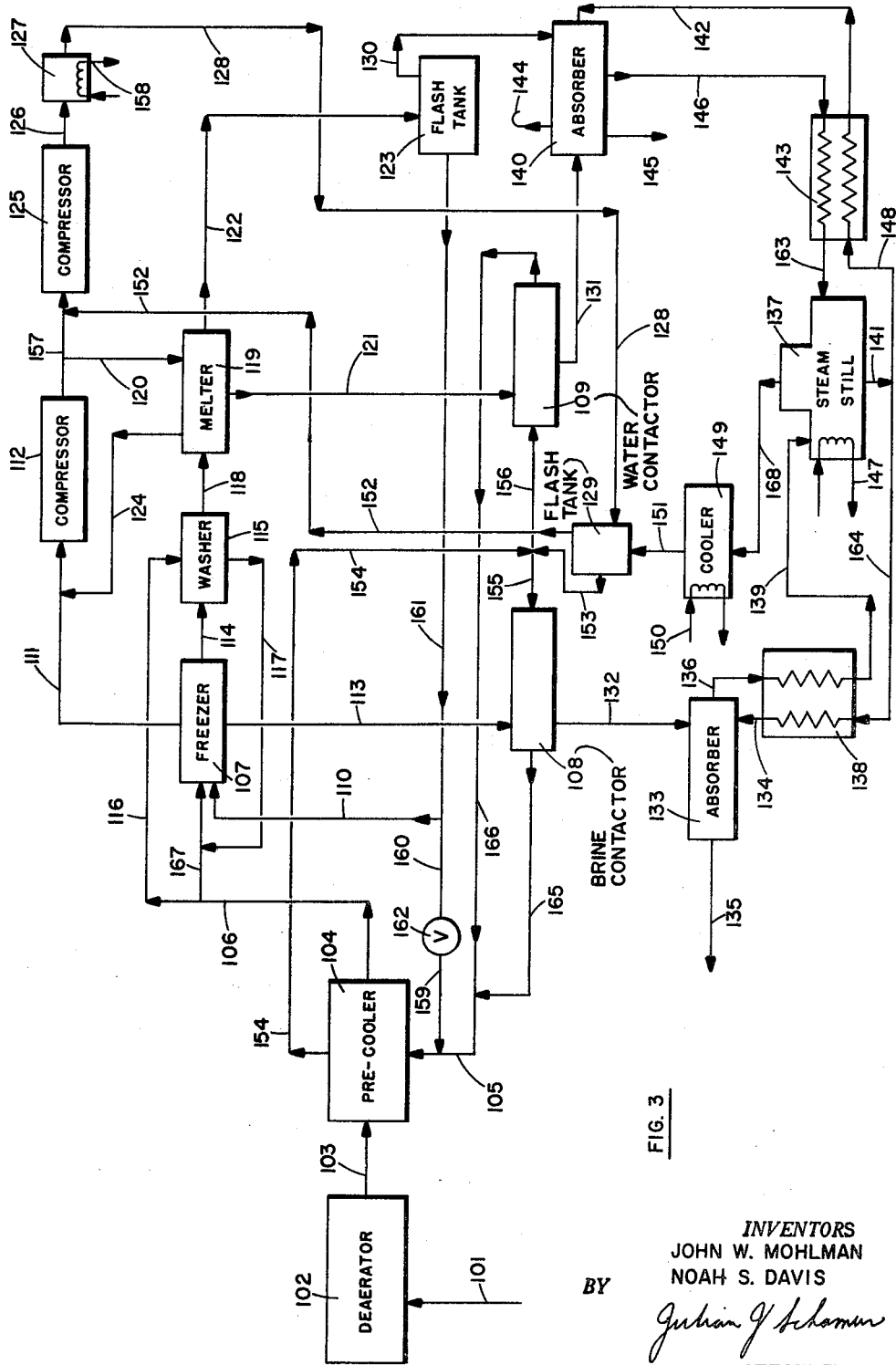

FIG. 3 is a schematic of a process using a single refrigerant to freeze, melt, cool, and heat-exchange in the production of potable water from sea water according to this invention.

The objects of this invention are accomplished by providing a process for separating less concentrated solution from a relatively more concentrated solution containing dissolved gases which includes the steps of forming solids in a solution of intermediate concentration by direct contact with a vaporizable liquid refrigerant, separating the solids from residual solution and subsequently forming a liquid from the solids by contacting the solids with warmed refrigerant vapors, wherein the refrigerant becomes contaminated with dissolved gases from the solution and the liquid becomes contaminated with refrigerant, decontaminating the refrigerant by absorbing a portion thereof into a quantity of relatively low vapor pressure liquid in which the refrigerant is soluble, which liquid has a relatively low solubility for the dissolved gases, venting the gases from the system in the absorption process, subsequently separating the refrigerant and the low vapor pressure liquid by distillation, and decontaminating the liquids by contact with the relatively low vapor pressure liquid to remove dissolved refrigerant, and separating refrigerant from the low vapor pressure liquid.

The process of this invention is applicable to systems wherein a component of a solution is separated from the solution by the formation of solids and residual solution by transferring energy from the solution. Thus, the recovery of relatively demineralized water from aqueous solutions such as sea water by freezing or by refrigerant hydrate formation may be effected by the process of this invention. Additionally, the concentration of solutions to remove a portion of the solvent in which either the solvent or the concentrate is the desired product is enhanced by the practice of this invention. The invention is, therefore, applicable to a process for preparing frozen concentrates such as orange juice and frozen concentrated coffee. In addition, the application of freezing or solid formation may be employed as a step in the preparation of dehydrated products ordinarily containing water. Similarly, the process has application to methods for recovering essentially all the solvent from the solution to prepare a solid product.

A preferred embodiment of the invention relates to the recovery of fresh water from saline solutions such as sea water, brackish waters, or other unpotable water containing dissolved material such as inorganic salts and dissolved gases such as the components of air. A particularly preferred embodiment is the recovery of fresh water from sea water by partially freezing the sea water. In such a process, the incoming sea water is pre-cooled to near its freezing point by one of several methods. The pre-cooling may be accomplished by conventional indirect heat exchange with a cooling medium. However, it is preferred to accomplish cooling by direct contact with a heat exchange medium which may be the same fluid as is employed as a refrigerant. However, it is extremely advantageous to pre-cool the sea water in direct contact with a liquid heat-transfer medium having a lower vapor pressure than the refrigerant. In a particularly preferred embodiment of this invention, the heat-transfer medium has a low solubility for the gaseous components of the sea water and a high solubility for the particular refrigerant employed.

After pre-cooling the sea water it is partially frozen in direct contact with the vaporizable liquid refrigerant, thus forming refrigerant vapors, ice and residual brine. At this point in the process the gases dissolved in the sea water tend to accumulate in the refrigerant vapors formed. The residual solution and ice are separated and the ice may be washed with additional sea water, which has preferably been pre-cooled, to remove residual more concentrated brine adhering to the ice crystal. If desired, an additional wash with relatively pure water may be provided to further remove occluded brine from the ice. In order to conserve material and energy in the system, the washings may be recirculated to the freezing operation.

The refrigerant vapor containing the gases picked up from the sea water are compressed and employed in melting the ice to produce the desired fresh water product. When water is removed from the sea water by hydrate formation the vaporizing refrigerant forms a hydrate in the freezing step and this hydrate is decomposed by the refrigerant vapors.

The product water and residual brine from the freezing process are both at significantly lower temperatures and may be used to cool the heat-transfer medium so that it may be reused to cool additional incoming sea water. This may be accomplished by conventional indirect contact of the brine and water with the heat-transfer medium. It may also be accomplished by direct contact with brine and water with refrigerant when the refrigerant is employed as the initial heat-transfer medium. Preferably, however, the supplemental heat-transfer fluid employed in direct contact to pre-cool incoming sea water is cooled by direct contact with product brine and water is reused in the cooling step.

In the freezing and melting steps refrigerant tends to dissolve in the brine and water product streams and must be recovered from these streams in order to provide an economic process.

In order to free the refrigerant stream of dissolved gas, the present invention provides that a portion of the refrigerant in the cycle be absorbed into a fluid in which it is soluble and in which the gaseous components of air are relatively insoluble. In this way only the refrigerant becomes dissolved in the absorbing fluid and inert gases may be vented from the system without loss of valuable refrigerant. Simple distillation or stripping means may be used to separate the refrigerant from the absorbing fluid for return to the system.

In order to recover the refrigerant dissolved in the product brine and water streams, this invention provides that these streams be contacted with a fluid having a low miscibility with water and in which the refrigerant is sufficiently soluble so that it is extracted from the aqueous phase into the water-immiscible fluid. Refrigerant may then be recovered from this fluid by stripping or distillation. This separation is preferably conducted simultaneously with the separation of refrigerant from the fluid in which it is absorbed to free the system of dissolved gases. Thus, it is particularly preferred that the absorbing fluid and the water-immiscible fluid be the same.

Another aspect of this invention provides for the heat-transfer medium, the water-immiscible fluid and the fluid employed as the refrigerant absorber to be the same. In this embodiment of the invention the steps of warming the residual brine and product water to remove dissolved refrigerant are combined with extraction.

When the incoming sea water is pre-cooled in direct contact with the immiscible fluid a small portion of the fluid contaminates the water. When the water is transferred to the freezing operation the water-immiscible fluid tends to carry over into the refrigerant vapor phase and thus further contaminate the refrigerant. In an embodiment of the invention provision is made for separating the heat-transfer fluid from the refrigerant by partially condensing a portion of the compressor output into a liquid rich in the heat-transfer medium. Refrigerant and heat-transfer medium may then be separated from this liquid in the same stripping or distillation process employed for separating refrigerant fluid mixtures arising in other portions of the process.

In the accompanying drawings miscellaneous pumps, valves, control units, and several optional cooling operations have not been illustrated since the drawings are intended as schematic representation of the process of this invention.

Referring to FIGS. 1 and 2, sea water is pumped from a storage tank 10 (or other source) through a pump 11 to the pre-cooler 12 through line 13. In the pre-cooler 12, the water is cooled to near its freezing point in direct contact with cold kerosene entering through line 14. The thus cooled sea water leaves the pre-cooler 12 via line 15 to the freezing and melting operation, while the kerosene warmed in the pre-cooler 12 exits through line 17, and a portion is admitted to the absorber 18 through line 77. In the absorber unit 18 a portion of the refrigerant vapor, for example butane, used in the freezing operation, enters through line 19. A sufficient quantity of the kerosene is admitted to the absorber to completely dissolve the amount of refrigerant input. In order to facilitate absorption of the refrigerant, the absorber 18 may be cooled, for example, by unprocessed sea water. The remainder of the kerosene from the sea water contactor 12 is admitted to surge tank 20. Any inert gases in the refrigerant stream 19 which are not absorbed in the kerosene are vented to the atmosphere through line 21 to the inert vent 22. The mixed stream of kerosene and butane refrigerant is carried from the absorber 18 through line 23 to a cooler 24 where the mixture is cooled with sea water flowing through a series of coils 25. The cooled stream of refrigerant and kerosene is then fed through line 26 to the tank 20, which is also vented to the atmosphere through line 27 to the inert vent 22. Thus, a portion of the butane refrigerant used in the freezing cycle which has picked up oxygen and nitrogen dissolved in the sea water is freed of these gases in the absorber without the necessity of stripping the butane stream as a separate operation.

To free the kerosene stream now contaminated with butane, a portion of the kerosene is pumped from tank 20 via pump 16 and lines 28 and 29 through a heat exchanger 30 and line 31 to a suitable debutanizing unit such as a steam still 32. In the still 32 butane is stripped from the kerosene stream at an elevated temperature and the hot kerosene is returned to the heat exchanger 30 via line 33, while purified butane refrigerant is taken off the still 32 via line 34 and returned to the secondary compressor 43 through lines 81 and 82. A part of the overhead butane vapor is condensed at 74 and returned to the still as reflux through lines 76 and 78.

After flowing through line 67, the kerosene cooled in the exchanger 30 is further cooled in the contactor 65 in direct contact with reject brine entering through line 66. The warmed brine leaves the system through line 68 for disposal or other processing. Kerosene cooled in contactor 65 flows through line 69 to be combined with kerosene from tank 20 in line 79, and be subjected to further cooling in contactor 38.

The largest portion of the kerosene from tank 20 passes through lines 28, 35, and 36 to brine contactor 38 and through lines 28, 35 and 75 to the product water contactor 37. In the product water contactor demineralized sea water from the melter 39 is contacted with the kerosene to cool the kerosene for further use in the pre-cooler 12. Likewise, reject brine from the freezer 40 is warmed in the brine contactor 38 to cool the kerosene for reuse in the pre-cooler 12.

Most of the dissolved gases from the incoming sea water will dissolve into the refrigerant stream, and a partial pressure of air components will result in the melter 39 since the air components will be more soluble in the liquid refrigerant than in water. To maintain partial pressure of air in the melter it is desirable to bleed a small amount of vapor from the melter through lines 41 and 56 to the primary compressor 42. In this way the largest amount of air will end up dissolved in the liquid refrigerant effluent from the melter 39.

In order to free the refrigerant of dissolved kerosene and to supply additional cooling to the system, some of the vapor effluent from primary compressor 42 is further compressed in the secondary compressor 43 after passing through line 82. These vapors are then passed through line 44 and are split into two streams 45 and 46. The greatest proportion of the output of secondary compressor 43 is condensed in the condenser 47, while a small portion is partially condensed in condenser 48, which is cooled by any convenient method, for example, by circulating sea water at ambient temperature in indirect contact with the gases, as shown at 49. The partially condensed refrigerant from the condenser 48 which is contaminated with both kerosene and air components, is separated into liquid and vapor components in the separator 50 after passing through line 80, and the liquid is carried via line 51 which is equipped with trap 71 to the steam still 32, where, as explained above, refrigerant and kerosene are separated. The vapor effluent from the separator 50 passes through line 52 and is recombined with the remainder of the output from the secondary condenser and totally condensed in condenser 47. The condensed refrigerant from the condenser 47 is then reintroduced into the freezing cycle via line 73, optionally leading to flash drum 72 where the liquid refrigerant is cooled to approximately the temperature of the freezer, and the vapor is recycled to the suction of the secondary compressor 43 through line 81. The liquid refrigerant from condenser 47 is supplied to the freezer via line 53.

Since the effluent cold refrigerant liquid from the melter 39 is richest in dissolved air, it is passed through line 54 to a partial flash drum 55 where a portion is allowed to evaporate and is taken through line 19 to the absorber 18 for removal of dissolved gases, as illustrated above. This evaporation of a portion of the effluent refrigerant also serves the purpose of cooling the remaining refrigerant for reuse in the freezing cycle. The remainder of the cold liquid refrigerant from flash drum 55 is combined with the effluent from condenser 47 and returned through lines 73 and 53 to the freezing vessel 40, through flash drum 72 when it is employed.

In the water purification cycle, itself, sea water which has been pre-cooled in the pre-cooler 12 passes through line 15 to the freezer 40 where it is partially frozen in direct contact with cold liquid butane entering through line 53. The freezing is accompanied by evaporation of the liquid refrigerant, which vapor is taken through line 56 to the primary compressor 42. The largest fraction of the output of the primary compressor is passed through line 57 to the melter 39 where it is liquefied in contact with ice. In this process the ice melts, producing product water which is then taken to the water contactor 37 via line 58. The remaining portion of the vapor from compressor 42 passes through line 82 along with vapors from lines 34 and 81 and is recompressed in the secondary compressor 43, partially condensed to remove kerosene contaminant, as explained above, and returned to the refrigerant cycle.

Residual brine is removed from the brine-ice mixture in the freezer 40 and carried through line 59 to the brine contactor 38 where it is used to cool kerosene. Ice and some residual brine are carried from the freezer 40 to the washer 60 via line 61 where the ice is freed of as much residual brine as possible by partial melting or washing with unprocessed sea water from the pre-cooler 12. Unprocessed sea water, when used to wash the ice, enters the washer 60 via line 15 through line 62. Residual wash water from the washer may be discarded or recirculated to the freezer 40 via line 63. Ice which has been washed with unprocessed cooled sea water in the washer 60 may be further subjected to washing with demineralized water or partial melting to remove any additional occluded brine, and is then transferred.

Cooled kerosene is discharged from the contactors 38 and 37 through lines 83 and 84 and combined in line 14 for return to the pre-cooler 12. Brine warmed in contactor 38 flows out of the system through line 66, contactor 65 and line 68, while product water used to cool kerosene leaves the system for storage, use or processing through line 70. The product water and reject brine both contain amounts of dissolved refrigerant prior to entering the contactors 37 and 38. However, upon contact with the kerosene the butane refrigerant is transferred to the kerosene stream for subsequent purification in the still 32.

When additional butane and kerosene are necessary to replace minor amounts lost in the system as for example in the vent 22 (butane) or with the effluent brine and water (kerosene), additional quantities may be added to the system at any convenient location. It is, for example, convenient to equip the tank 72 with a source of supplemental liquid butane as a make up. Additional kerosene may, for example, be admitted into line 67 for cooling in the supplemental contactor 65 and inclusion in the system to replace quantities lost in effluent.

Thus, the problems associated with stream contamination in the process are solved with no build up of liquid refrigerant in the liquid heat-transfer medium, while air is successfully removed from the system without the necessity of deaeration prior to pre-cooling or freezing the sea water. Although some refrigerant may be lost through the vent 22 and some kerosene is lost from the system through the brine contactors 38 and 65, and the product water contactor 37, these losses are much smaller than the losses entailed in venting to the atmosphere from the melter to remove air.

FIG. 3 is a schematic diagram of an embodiment of the invention using a single refrigerant heat-transfer fluid. The sea water may be led from storage through line 101 to a deaerator 102, such as a barometric leg, to remove some of the dissolved air and other gases. From the deaerator it is pumped through line 103 to the pre-cooler 104 where it is cooled by direct contact with a cold liquid refrigerant such as isobutane entering through line 105.

Although the process is illustrated with a deaerator, inclusion of the deaerator is optional since dissolved air is removed at a subsequent stage of the process. The deaerator has the advantage that partial pressure of air in the refrigerant vapor cycle may be somewhat reduced. However, since the removal of dissolved gases in the deaerator is not complete and since the solubility of the dissolved gases is greater in isobutane than in water, inerts tend to concentrate in the refrigerant cycle even when the deaerator is employed.

The effluent cooled sea water from the pre-cooler 104 is taken through line 106 and the main portion admitted to the freezer 107 through line 167. Warmed liquid isobutane from the pre-cooler is conducted via lines 154, 155, and 156 to the residual brine and product water contactors 108 and 109. The cooled sea water is admitted to the freezer 107 and cold isobutane enters through line 110. The isobutane and sea water may be mixed before entering the freezer 107. The liquid isobutane vaporizes in the freezer and thus freezes a portion of the water. Gaseous isobutane is taken from the freezer 107 through line 111 and compressed in compressor 112. Concentrated brine resulting from the freezing is removed from the freezer 107 through line 113 while the ice formed and some of the residual brine is transferred through line 114 to the washer 115. The ice and brine in the washer are washed with a small portion of pre-cooled sea water entering through line 116. Wash water and drainage from the ice crystals are removed from the washer through line 117 and may be readmitted to the freezer. It is also desirable to wash the ice with a small amount of product water or to melt a small amount of the ice to remove residual brine prior to complete melting. The washed ice is taken through line 118 to the melter 119. In the melter 119 compressed refrigerant entering through line 120 is condensed to a liquid in contact with the ice, thus melting the ice. The water produced from melting the ice contains some dissolved refrigerant and is removed via line 121 to the product water contactor 109, while liquid isobutane formed is removed through line 122 to the flash tank 123.

In the freezing vessel 107 and melter 119 dissolved air tends to transfer to the isobutane phase and concentrate in the melter. In order to maintain a proper partial pressure of air in the melter to effect the transfer from the water phase to the isobutane phase, a portion of the vapor in the melter 119 may be bled through line 124 to the suction of the primary compressor 112 if necessary to prevent build up of gas pressure in the melter.

A portion of the output of the primary compressor 112 is taken through line 157, compressed in the second stage compressor 125, and carried through line 126 to the heat exchanger 127, where the vapors are condensed by indirect contact with a cooling medium such as unprocessed sea water flowing through coils 158. The condensed liquid is then conducted through line 128 to the flash tank 129 where it is combined with isobutane recovered from the water phase in a subsequent part of the process. If necessary, the isobutane flowing through line 128 may be further cooled, for example with cold product water, prior to entering the flash tank 129.

The isobutane which was warmed upon contact with water in the pre-cooler 104 is conducted through lines 154, 155, and 156 to the brine contactor 108 and product water contactor 109. In the brine contactor 108 concentrated brine from the freezer entering through line 113 is warmed by the direct contact with the isobutane which is thus cooled. Similarly, in the product water contactor product water flowing through line 121 is warmed in contact with the isobutane. Cooled refrigerant leaves the contactors 108 and 109 through lines 165 and 166 to be combined in line 105 for return to the pre-cooler 104.

The effluent liquid isobutane from the melter which collects in flash drum 123 is slightly cooled by flash evaporation of a small portion which is rich in dissolved gases. This flash portion of the refrigerant leaves the flash drum 123 through line 130. The remainder of the refrigerant in the liquid phase then completes the cycle through lines 161 and 105, and line 110 to the freezer. An interconnection may be made between line 161 and 105 by way of valve 162 and lines 159 and 160 to adjust butane flow to the freezer 107 and pre-coller 104.

The refrigerant vapor in line 130, the effluent product water from the contactor 109 in line 131, and the effluent brine from contactor 108 in line 132 are contaminated. The refrigerant is rich in dissolved gases while the effluent brine and water are contaminated with refrigerant. In order to remove inert air from the system and strip the effluent brine and water of refrigerant for return to the system these streams are purified by absorption into a liquid which is a good solvent for the refrigerant and a poor solvent for water and the components of air. Thus, the effluent brine flowing through line 132 is passed into absorber 133 where the dissolved isobutane is transferred into a solvent such as octane entering through line 134. Effluent brine leaves the absorber through line 135 to storage or further processing. The absorber 133 is operated at a temperature convenient to remove the refrigerant from the water. The octane-containing isobutane leaves absorber 133 through line 136 and is heat exchanged with effluent octane from the still 137 in the heat exchanger 138. The effluent octane from the absorber 133, after passing through heat exchanger 138, is fed to the still 137 through line 139. Similarly, effluent product water leaving the contactor 109 through line 131 enters a second absorber 140 where it is stripped of isobutane by a second octane stream flowing from the still 137 through lines 141, 142, and 148 via the second heat exchanger 143. In addition to the effluent product water, the absorber 140 also receives the isobutane vapor flowing through line 130. The isobutane from the water and the air-contaminated isobutane stream are absorbed into the octane and inert gases are vented to the atmosphere from the absorber 140 through the vent 144. Product water, free of refrigerant, leaves the absorber through line 145 for use, storage, or further processing. Isobutane-rich octane leaves the absorber through line 146 and is admitted to the still via the heat exchanger 143 and line 163. The still may be heated in any convenient manner such as by steam coils, shown at 147, and effects the separation of octane and isobutane. Isobutane-free octane leaves the still through lines 141, 148, and 164 and passes to the heat exchangers 138 and 143. It is also desirable to further cool the effluent octane in lines 134 and 142 prior to reuse in the absorbers 133 and 140. This may be accomplished by direct contact cooling with unprocessed sea water in coolers interspersed between heat exchanger 138 and absorber 133 and heat exchanger 143 and absorber 140. Pure isobutane is taken overhead from the still 137 and passed through line 168 and condenser 149. A portion of the isobutane may be refluxed in the still, as shown in FIG. 2 at 32, 74, 76, and 78. The condenser 149 may employ indirect contact cooling with a cooling medium such as unprocessed sea water, as shown at 150. The condensed refrigerant then passes through line 151 and into the flash drum 129 where it is combined with the condensed compressed refrigerant from the secondary compressor flowing through line 128. In flash drum 129 a portion of the mixed streams is flashed to cool the isobutane vapor and the flashed portion is returned to the secondary compressor via line 152. The remainder of the thus cooled liquid isobutane is further cooled by removal from the flash drum 129 through line 153 to the product water contactor 109 and brine contactor 108 via lines 155 and 156.

As in the process illustrated in FIGS. 1 and 2, it is also desirable to provide for replacement of any octane and isobutane dissipated in the process illustrated in FIG. 3. Make-up octane may be admitted to the system in any convenient location, for example direct contact at absorbers 133 and 140. Make-up isobutane is preferably admitted by a suitable valve arrangement into line 128 for entering into flash tank 129.

Thus, the process has been illustrated using only a single refrigerant-heat-transfer medium. The refrigerant is conserved in the system without the necessity of stripping the product streams by steam distillation and air and inert gases are removed without the loss of valuable refrigerant.

*Example 1*

To illustrate the application of this invention to the purification of sea water reference is again made to FIGS. 1 and 2. In order to purify ten million gallons per day of sea water having an ambient temperature of 70° F., 15,000 gal. per minute of sea water having a salt content of about 3.5% and approximately 1.13 lb. of dissolved oxygen, and 1.3 lb. of dissolved nitrogen per 1000 lb. is contacted in the pre-cooler 12. The flow of octane through the pre-cooler 12 is approximately 36,500 gal. per minute, which is contaminated with small amounts of dissolved oxygen and nitrogen. The octane enters pre-cooler 12 at about 30.5° F. and after contacting the sea water exits through line 17 at approximately 69° F. The sea water is cooled from 70° F. to effluent temperature of about 31.5° F. Of the 15,000 gal. of water passing per minute through line 15 about 7500 gal. per minute flows through line 62 to the washer and an equivalent amount is returned from the washer through line 63. Thus, the total input to the freezer is approximately 15,000 gal. per minute. Along with this quantity of water about 66,000 lb. of isobutane liquid at about 27.5° F. contaminated with about 1 lb. of octane enters the freezer 40, per minute, through line 53. Approximately 66,200 lb. of concentrated brine containing about 10 lb. of isobutane leaves the freezer through line 59, per minute, and are returned to the brine contactor 38. The remainder of the aqueous input is transferred to the washer 60 at a temperature of about 24.6° F. The washed ice is transferred to the melter 39 and melted in direct contact with about 6100 lb. per minute of isobutane vapors containing about 50 lb. of octane. The vapors are at a pressure of about 8.7 p.s.i.g. and enter the melter 39 from the compressor 42 via line 57 at a temperature of about 34.8° F. Approximately 6900 gallons of product water per minute are taken from the melter 39 through line 58 to the contactor 57 and enter the contactor at approximately 32.5° F. In the contactors 37 and 38 approximately the same octane flow is achieved as flows through the pre-cooler 12. In the contactors 38 and 37 octane is cooled from approximately 69° F. to an average of about 30° F. Since the reject brine flowing through contactor 38 has a lower freezing point than product water flowing through contactor 37, cooling in the brine contactor brings the octane temperature to under 26° F., while product water in the contactor 37 is cooled to approximately 32.5° F.

Of the total flow of refrigerant through the compressor 42, under 5000 lb. per minute is diverted to the secondary compressor 43 along with approximately 2500 lb. of refrigerant vapor from the flash tank 72. Of the total flow through the secondary compressor 43, about 4 lb. per minute represents occluded octane. About 50 percent of this octane is removed from the refrigerant stream along with about 25 times its weight of isobutane through the condenser 48 and separator 50 for final separation in the still 32.

A portion of the octane leaving the contactor 12 through line 17 enters the absorber 18 through line 77 where it absorbs about 100 lb. per minute of isobutane containing about one pound of dissolved oxygen and about 1.5 lb. of dissolved nitrogen. The oxygen and nitrogen leave the absorber 18 through line 21 and are released to the atmosphere through vent 22. Since the temperature of the isobutane-octane solution increases in the absorption process, the solution is cooled in cooler 24 and joins the remainder of the octane in tank 20. The majority of the octane is recirculated to the contactors 37 and 38 while about 2700 lb. per minute of the octane containing about 140 lb. refrigerant is admitted to the still 32. Isobutane recovered from the still is readmitted to the freezing operation via a secondary compressor 43, and octane recovered from the still is readmitted to the contactor 37 through supplemental contactor 65. Thus, approximately 7400 gallons per minute of relatively demineralized water and about 7600 gal. per minute of concentrated brine having an inert content of about 6.7% are produced with a minimum loss of heat-transfer fluid and refrigerant through contamination.

Refrigerants applicable to the present process include the lower aliphatic and olefinic hydrocarbons having a boiling point below that of the solution to be purified. In addition, halogenated hydrocarbons and other vaporizable refrigerants may be employed. Examples of applicable refrigerants include the hydrocarbons having from 2 to 4 carbon atoms such as propane, butane, isobutane, butene-1, butene-2, isobutylene, methylchloride, and various fluoro carbons, as well as carbon dioxides, ammonia, and the like. The refrigerant need not be a pure single refrigerant, but may be a mixture either blended to suit the needs of a particular cycle, or an available mixture such as field butane or LPG. It is, of course, preferred that the refrigerant be relatively insoluble in the solution being treated. Thus, in a process for obtaining potable water from sea water, the lower hydrocarbons and halogenated hydrocarbons are preferred.

The supplemental heat-transfer medium or absorber fluid employed in the process should be a relatively low vapor pressure inert liquid. For example, when processing sea water to produce fresh water, as illustrated in FIGS. 1 and 2, the heat-transfer medium may be a liquid higher aliphatic hydrocarbon which is a liquid from about 25° F. to about 100° F., such as hexane, heptane, octane, or commercially available mixtures of aliphatic, olefinic, and aromatic hydrocarbons derived from crude petroleum. Kerosene and gasoline are examples of such petroleum-derived liquids suitable as heat-transfer medium. These same fluids are applicable to the embodiment of the invention illustrated in FIG. 3.

In another embodiment of this invention the degree of purification of process streams may be minimized by employing mixtures of relatively high vapor pressure and relatively low vapor pressure liquids as the refrigerants. For example, in the process illustrated in FIG. 3, the refrigerant may be a mixture of propane and n-octane containing 32.2 mol percent propane and 67.8 mol percent octane. This mixed refrigerant vaporizes at 30° F. at 20 lb. per square inch absolute pressure. A further example of a mixed refrigerant is that composed of 62.4 mol percent isobutane and 37.6 mol percent n-octane which has a bubble point of 30° F. at 20 p.s.i.a. The requirement for such a mixed refrigerant in the process of this invention is that it completely volatilizes at the temperature and pressure conditions employed in the freezing vessel. Such mixed refrigerants have an advantage of minimizing the amount of stream purification necessary to remove the soluble portion of the refrigerant from the effluent product and waste streams. Since, in general, the higher boiling hydrocarbons are less expensive than the high vapor pressure refrigerants, the use of mixed refrigerants has the advantage that more of the low vapor pressure material will be lost in the effluent streams. Stream purification according to the present invention it still required to maintain the proper balance of mixed refrigerants in the system.

Although the invention has been described in detail, it is to be clearly understood that the same is by way of illustration and example only and is not to be taken by way of limitation, the spirit and scope of this invention being limited only by the terms of the appended claims.

We claim:
1. In a process for separating less concentrated solution from a solution of intermediate concentration containing dissolved gases by (1) freezing said solution of intermediate concentration in direct contact with a vaporizable liquid refrigerant to form (a) refrigerant vapors, (b) solids comprising said less concentrated solution and (c) more concentrated residual solution, (2) comprising said refrigerant vapor, (3) separating said solids from said more concentrated residual solution, (4) melting said solids in direct contact with said compressed refrigerant vapor to form said less concentrated solution and cold liquid refrigerant, and (5) recirculating said cold liquid refrigerant to step (1), in which process said refrigerant becomes contaminated with said dissolved gases and said solutions become contaminated with said refrigerant in steps (1) and (4), the improvement which comprises (A) absorbing a portion only of said refrigerant in a liquid of relatively low vapor pressure in which said refrigerant is soluble and in which said gases are comparatively in- soluble to form a refrigerant-liquid mixture free of said gases, (B) separately contacting said residual solution and said less concentrated solution with a portion of said low vapor pressure liquid to extract said refrigerant and form additional liquid-refrigerant mixture and (C) distilling a portion of said liquid-refrigerant mixture from steps (A) and (B) to separate said low vapor pressure liquid from said refrigerant.

2. In a process for separating relatively demineralized water from an aqueous solution containing dissolved gases by (1) pre-cooling said solution to near the freezing point in direct contact with an immiscible heat-transfer liquid, (2) freezing said solution in direct contact with a vaporizable liquid refrigerant to form refrigerant vapors, ice, and more concentrated residual solution, (3) compressing said refrigerant vapor, (4) separating said ice from said more concentrated residual solution, (5) washing said ice to remove occluded residual solution, (6) melting said ice in direct contact with said compressed refrigerant vapor to form water and cold liquid refrigerant, (7) recirculating said cold liquid refrigerant to step (2), and (8) directly contacting said residual solution and said water separately with said heat-transfer liquid from step (1), in which process said refrigerant becomes contaminated with said dissolved gases, the improvement which comprises absorbing a portion of said refrigerant in a liquid of relatively low vapor pressure in which said refrigerant is soluble and in which said gases are comparatively insoluble to form a refrigerant-liquid mixture, and distilling said refrigerant-liquid mixture to separate said low vapor pressure liquid from said refrigerant.

3. The process of claim 2, wherein said heat-transfer liquid is said refrigerant.

4. The process of claim 2, wherein said heat-transfer liquid is said liquid of relatively low vapor pressure.

5. A process for obtaining potable water from sea water which comprises pre-cooling sea water containing dissolved gases to near its freezing point in direct contact with octane, partially freezing said sea water in direct contact with cold liquid isobutane refrigerant to form isobutane vapor, ice, and residual brine, thus contaminating said isobutane with said dissolved gases and contaminating said brine with said isobutane, compressing said isobutane vapor, separating said brine and said ice, washing said ice, melting said ice in direct contact with said compressed isobutane vapor to form cold liquid isobutane and water contaminated with said isobutane, vaporizing a portion of said cold liquid isobutane produced from melting said ice, absorbing said vaporized isobutane in octane, contacting said water and said residual brine with octane from the pre-cooling of said sea water to extract said isobutane, combining a portion of said octane which has contacted said brine and said water with a portion of said octane containing absorbed isobutane, and separating said isobutane from said octane.

6. A process for obtaining potable water from sea water which comprises pre-cooling sea water containing dissolved gases to near its freezing point in direct contact with octane, thus contaminating said sea water with octane, partially freezing said sea water in direct contact with cold liquid isobutane refrigerant to form isobutane vapor, ice, and residual brine, thus contaminating said refrigerant with said dissolved gases and said octane, and contaminating said brine with said isobutane, compressing said isobutane vapor, separating said brine and said ice, washing said ice, melting said ice in direct contact with said compressed isobutane vapor to form cold liquid isobutane and water contaminated with said isobutane, vaporizing a portion of said cold liquid isobutane produced from melting said ice, absorbing said vaporized isobutane in octane, contacting said water and said residual brine with octane from the pre-cooling of said sea water to extract said isobutane, partially condensing a portion of said compressed isobutane vapor to form a liquid rich in said octane, combining a portion of said octane which has contacted said brine and said water, a portion of said octane containing absorbed isobutane and said condensed liquid rich in octane, and separating said isobutane from said octane.

7. In a freezing process for treating a first solution containing gases to produce a second less concentrated solution and a third more concentrated solution, and wherein (1) said first solution is cooled by direct contact with a liquid refrigerant having a relatively high solubility for said gases, to provide solids, said third solution and refrigerant vapors, whereby said refrigerant vapors become contaminated with said gases; (2) said solids are separated from said third solution; (3) said refrigerant vapors are heated, and (4) the separated solids are converted to said second solution by contact with the heated refrigerant vapors, with said refrigerant vapors being liquified; that improvement which comprises (5) dissolving a portion only of said refrigerant in a relatively low vapor pressure liquid having a relatively low solubility for said gases whereby said gases are released from said refrigerant; (6) separating said refrigerant from said low vapor pressure liquid, and (7) recirculating liquid refrigerant from step (6) to step (1).

8. In a freezing process according to claim 7 in which the recited step (3) is performed by compression and the recited step (5) is performed downstream of said compression step.

9. In a freezing process for treating a first solution containing gases with a continuously recycled refrigerant to produce a second less concentrated solution and a third more concentrated solution, said refrigerant having a relatively high solubility for said gases, and wherein (1) said first solution is cooled by direct contact with liquid refrigerant in a phase of the recycling of the refrigerant to provide solids, said third solution and refrigerant vapors, whereby said refrigerant vapors become contaminated with said gases; (2) said solids are separated from said third solution; (3) said vapors are heated, and (4) the separated solids are converted to said second solution by contact with the heated refrigerant vapors, with said refrigerant vapors being liquified; that improvement which comprises (5) dissolving a portion only of said refrigerant in another phase of said recycling in a relatively low vapor pressure liquid having a relatively low solubility for said gases whereby said gases are released from said refrigerant; (6) separating said refrigerant from said low vapor pressure liquid, and (7) recirculating liquid refrigerant from step (6) to step (1).

10. In a process for treating a first solution with a refrigerant to produce a more concentrated solution and solids convertible to form a less concentrated solution, said refrigerant being one which through contact with said first solution forms said solids and said more concentrated solution, and wherein: (1) said refrigerant is passed through a treating cycle; (2) said first solution is contacted with liquid refrigerant in one phase of said cycle to form said solids, said more concentrated solution and refrigerant vapors; (3) said solids are separated from said more concentrated solution, and (4) said solids are heated in the presence of said refrigerant vapors in another phase of said cycle to liquify the refrigerant vapors and to form said less concentrated solution, said less and more concentrated solutions being contaminated with said refrigerant in steps (2) and (4); that improvement which comprises: (5) passing a relatively low vapor pressure liquid which is relatively immiscible with said less and more concentrated solutions into direct contact with said less and more concentrated solutions, said refrigerant being more soluble in said low vapor pressure liquid than in said solutions, whereby said refrigerant becomes dissolved in said low vapor pressure liquid, (6) separating said refrigerant and said low vapor pressure liquid in another phase of said cycle, and (7) recirculating said refrigerant from step (6) to step (2).

11. A process for separating a less concentrated solution from a relatively more concentrated solution comprising the steps of (1) forming solids and said more concentrated solution from a solution of intermediate concentration containing dissolved gases by direct contact with a vaporizable liquid refrigerant with said liquid being converted to vapor; (2) separating said solids from said more concentrated solution; (3) heating said vapor; (4) forming said less concentrated solution from said solids by contacting said solids with the heated refrigerant vapors, said refrigerant being contaminated with said dissolved gases, said less and more concentrated solutions, being contaminated with refrigerant in steps (1) and (4); (5) decontaminating said refrigerant by absorbing a portion only thereof into a quantity of relatively low vapor pressure liquid in which said refrigerant is soluble, said low vapor pressure liquid having a relatively low solubility for said dissolved gases; (6) decontaminating said less and more concentrated solutions by absorbing said refrigerant therefrom into quantities of said low vapor pressure liquid; and (7) separating said refrigerant from said low vapor pressure liquid.

12. The process of claim 11, wherein said solution of intermediate concentration is sea water.

13. The process of claim 12, wherein said refrigerant is a lower aliphatic hydrocarbon.

14. The process of claim 13, wherein said low vapor pressure liquid is a higher aliphatic hydrocarbon.

References Cited by the Examiner

UNITED STATES PATENTS

| | | | |
|---|---|---|---|
| 2,363,440 | 11/44 | Roswell | 62—475 X |
| 2,551,666 | 5/51 | Gilmore | 62—475 X |
| 2,780,281 | 2/57 | Reinert. | |
| 2,821,304 | 1/58 | Zarchin | 62—58 |
| 2,904,511 | 9/59 | Donath. | |
| 2,997,856 | 8/61 | Pike | 62—58 |
| 3,098,733 | 7/63 | Rosenstein | 62—58 |

FOREIGN PATENTS

| | | |
|---|---|---|
| 70,507 | 6/46 | Norway. |
| 217,766 | 10/58 | Australia. |
| 841,374 | 7/60 | Great Britain. |

OTHER REFERENCES

Gilliland: "Fresh Water for the Future," Industrial and Engineering Chemistry, volume 47, Number 12, December 1955, pages 2410–2422.

NORMAN YUDKOFF, *Primary Examiner.*
ROBERT O'LEARY, *Examiner.*